United States Patent
Wong et al.

(10) Patent No.: US 10,883,436 B2
(45) Date of Patent: Jan. 5, 2021

(54) METHOD AND SYSTEM TO CONTROL PROPULSION SYSTEMS HAVING SENSOR OR ACTUATOR DEGRADATION

(71) Applicant: GM Global Technology Operations LLC, Detroit, MI (US)

(72) Inventors: Kevin C. Wong, Canton, MI (US); Jeffrey M. Hutmacher, Fowlerville, MI (US); Marcus S. Gilbert, Grass Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 56 days.

(21) Appl. No.: 15/485,917

(22) Filed: Apr. 12, 2017

(65) Prior Publication Data

US 2018/0298839 A1    Oct. 18, 2018

(51) Int. Cl.
| | | |
|---|---|---|
| *F02D 41/22* | (2006.01) | |
| *F02D 41/14* | (2006.01) | |
| *F02D 41/28* | (2006.01) | |
| *G07C 5/08* | (2006.01) | |

(52) U.S. Cl.
CPC ....... *F02D 41/222* (2013.01); *F02D 41/1454* (2013.01); *F02D 41/1458* (2013.01); *F02D 41/1495* (2013.01); *F02D 41/22* (2013.01); *F02D 41/28* (2013.01); *F02D 41/221* (2013.01); *F02D 2041/286* (2013.01); *G07C 5/0808* (2013.01); *Y02T 10/40* (2013.01)

(58) Field of Classification Search
CPC ................. F02D 41/221; F02D 41/222; F02D 2041/286; F02D 41/1454; F02D 41/1458; F02D 41/1495; F02D 41/22; F02D 41/28; G07C 5/0808; Y02T 10/40
See application file for complete search history.

(56) References Cited

U.S. PATENT DOCUMENTS

| | | | | |
|---|---|---|---|---|
| 6,804,600 B1* | 10/2004 | Uluyol | ..................... | G05B 9/02 123/479 |
| 8,275,193 B2* | 9/2012 | Lin | ...................... | G06K 9/3216 382/103 |
| 2004/0084024 A1* | 5/2004 | Malaczynski | ......... | F02D 35/021 123/435 |
| 2015/0361859 A1* | 12/2015 | Youssef | .................. | F01N 11/00 701/34.4 |

* cited by examiner

*Primary Examiner* — Lindsay M Low
*Assistant Examiner* — Ruben Picon-Feliciano

(57) ABSTRACT

A method to detect and mitigate sensor or actuator degradation in an automobile system includes: collecting a signal data output from at least one device which is outputting the signal data in response to monitored operational parameters of a motor vehicle system; analyzing patterns of the signal data compared to a signal data output from a nominal operating one of the at least one device using an artificial intelligence program; and identifying when the patterns of the signal data exceed a threshold level indicating the at least one sensor or actuator is operating in a degraded condition.

13 Claims, 4 Drawing Sheets

METHOD AND SYSTEM TO CONTROL PROPULSION SYSTEMS HAVING SENSOR OR ACTUATOR DEGRADATION

INTRODUCTION

The present disclosure relates to automobile vehicle sensors and actuators and system operation after signal degradation is identified.

Automobile systems use multiple different types of sensors and actuators. Sensor types include pressure, temperature, position, acceleration, chemical constituent, mass flow, voltage, and current and the like. Actuator types include fuel injector, throttle blade, turbo wastegate, CAM phasers, spark plug, fuel pump, exhaust gas recirculation, active fuel management, variable lift cam, alternator and electrical current, and variable geometry turbo and the like. Sensors and actuators are originally set for optimum or normal operating conditions, but can "degrade" and eventually fail. As used herein, the term "sensor" is also applicable to actuator.

Using as an example an oxygen sensor, in automotive applications with gasoline engines there are tight emissions constraints on diesel and gasoline engines. Gasoline engines perform better in emissions because they use a catalytic converter which converts approximately 99% of the engine out emissions to environmentally friendly constituents at the tail pipe. It is important to maintain engine out emissions with average emissions constituents that are at stoichiometry. It is known to use oxygen sensors to determine whether the exhaust emissions are lean or rich of stoichiometry. If either lean or rich, an engine controller then applies closed loop fuel control to change the fuel control to drive the system the opposite way. For example if the oxygen sensor indicates the system is lean, the fuel control system adjusts the system to be rich.

One failure is known as a lean to rich slowness, in which the fuel control system directs a change from rich to lean with the expectation that the oxygen sensor will indicate the change in a predefined time and shape. When the sensor is degraded or failing, however, the time for the change to be indicated takes longer than anticipated (longer than at original system optimal level), and the control system therefore reacts to the time delay as if the sensor is operating properly and both over-compensates and under-compensates in response. The control system is tuned based on a nominal or expected performance of the oxygen sensor. When the oxygen sensor degrades from nominal the emissions performance of the system can degrade. Sensor signals can be fed to a fault indicator which indicates with a sensor illumination signal that a problem is occurring, however, this system provides substantially no margin for sensors which are degrading, but which have not yet failed, and there is no operational control to provide continued sensor or actuator operation in a degraded condition with the control system able to accommodate a degraded sensor or actuator.

The above noted sensors and actuators have similar degradation and failure modes. Thus, while current automotive sensors and actuators achieve their intended purpose, there is a need for a new and improved system and method for determining sensor and actuator fault and to mitigate degradation.

SUMMARY

According to several aspects, a method to detect and mitigate sensor or actuator degradation in an automobile system includes: collecting signal data from at least one device which is outputting the signal data related to operational parameters of a vehicle system; analyzing patterns of the signal data compared to patterns of signal data from a nominal operating device; and identifying when at least one of the patterns of the signal data from the at least one device deviate from a threshold, the deviation indicating the at least one device is operating in a degraded condition.

In an additional aspect of the present disclosure, the method includes analyzing the patterns using an artificial intelligence pattern recognition program.

In another aspect of the present disclosure, the method includes identifying when differences between the patterns of the collected signal data and the patterns of signal data from the nominal operating device are within a predetermined statistical range.

In another aspect of the present disclosure, the method includes identifying when the differences between the patterns of the collected signal data and the patterns of signal data from the nominal operating device are within a degraded but acceptable range.

In another aspect of the present disclosure, the method includes generating corrective data to change the operational parameters of the vehicle system such that the at least one of the patterns is modified to correspond to the patterns of the signal data from the nominal operating device.

In another aspect of the present disclosure, the method includes applying the corrective data using a system controller to change system control parameters to allow the at least one device and the system to continue operation.

In another aspect of the present disclosure, the method includes generating a fail signal when the differences between the patterns of the collected signal data and the patterns of signal data from the nominal operating device exceed the degraded but acceptable range.

In another aspect of the present disclosure, the method includes prior to the analyzing step adding signals from at least one of multiple sensors and actuators together with the signal data from at least one device.

In another aspect of the present disclosure, the method includes selecting between the steps of: (a) generating corrective data to change the operational parameters of the vehicle system such that the at least one of the patterns is modified to correspond to the patterns of the signal data from the nominal operating device; or (b) if the corrective data cannot modify the patterns to correspond to the patterns of the signal data from the nominal operating device, identifying the at least one device as faulted.

In another aspect of the present disclosure, the method includes: generating a probability of device diagnostic pass for each of a plurality of device fault box settings; and reducing a variation +−4 σ range for each device fault box setting.

According to several aspects, a method to detect and mitigate sensor or actuator degradation in an automobile system includes: collecting a signal data output from at least one device which is outputting the signal data in response to monitored operational parameters of a motor vehicle system; analyzing patterns of the signal data compared to a signal data output from a nominal operating one of the at least one device using an artificial intelligence program; and identifying when the patterns of the signal data exceed a threshold level indicating the at least one sensor or actuator is operating in a degraded condition.

In another aspect of the present disclosure, the method includes identifying a state of the at least one sensor or actuator.

In another aspect of the present disclosure, the method includes predicting a value of sensor or actuator degradation classifying the state of the at least one sensor or actuator.

In another aspect of the present disclosure, the method includes illuminating a system warning if the classification exceeds a threshold defining the sensor or actuator is faulted.

In another aspect of the present disclosure, the method includes: generating an output from the artificial intelligence pattern recognition program when the patterns of the signal data exceed the threshold level; and applying the output from the artificial intelligence pattern recognition program to change at least one system control setting to minimize a degradation of the system performance, including emissions, fuel economy and noise and vibration.

In another aspect of the present disclosure, the at least one device includes at least one of a sensor and an actuator.

In another aspect of the present disclosure, the method includes modifying a control signal to change the operational parameters of the vehicle system until the signal data from the at least one device changes to substantially match the signal data from the nominal operating device.

According to several aspects, a system to control a propulsion system to correct sensor or actuator degradation includes at least one device outputting a signal data in response to monitored operational parameters of a motor vehicle system. An artificial intelligence program analyzes patterns of the signal data compared to a signal data output from a nominal operating one of the at least one device. A threshold level is applied to an output of the artificial intelligence program, the threshold level when exceeded identifying the at least one device is operating in a degraded condition.

In another aspect of the present disclosure, the at least one device includes a sensor used to determine at least one of a pressure, a temperature, a position, an acceleration, a chemical constituent, a mass flow, a voltage, and a current.

In another aspect of the present disclosure, the at least one device includes an actuator used for at least one of a fuel injector, a throttle blade, a turbo wastegate, a CAM phaser, a spark plug, a fuel pump, an exhaust gas recirculator, an active fuel manager, a variable lift cam, an alternator, and a variable geometry turbocharger.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
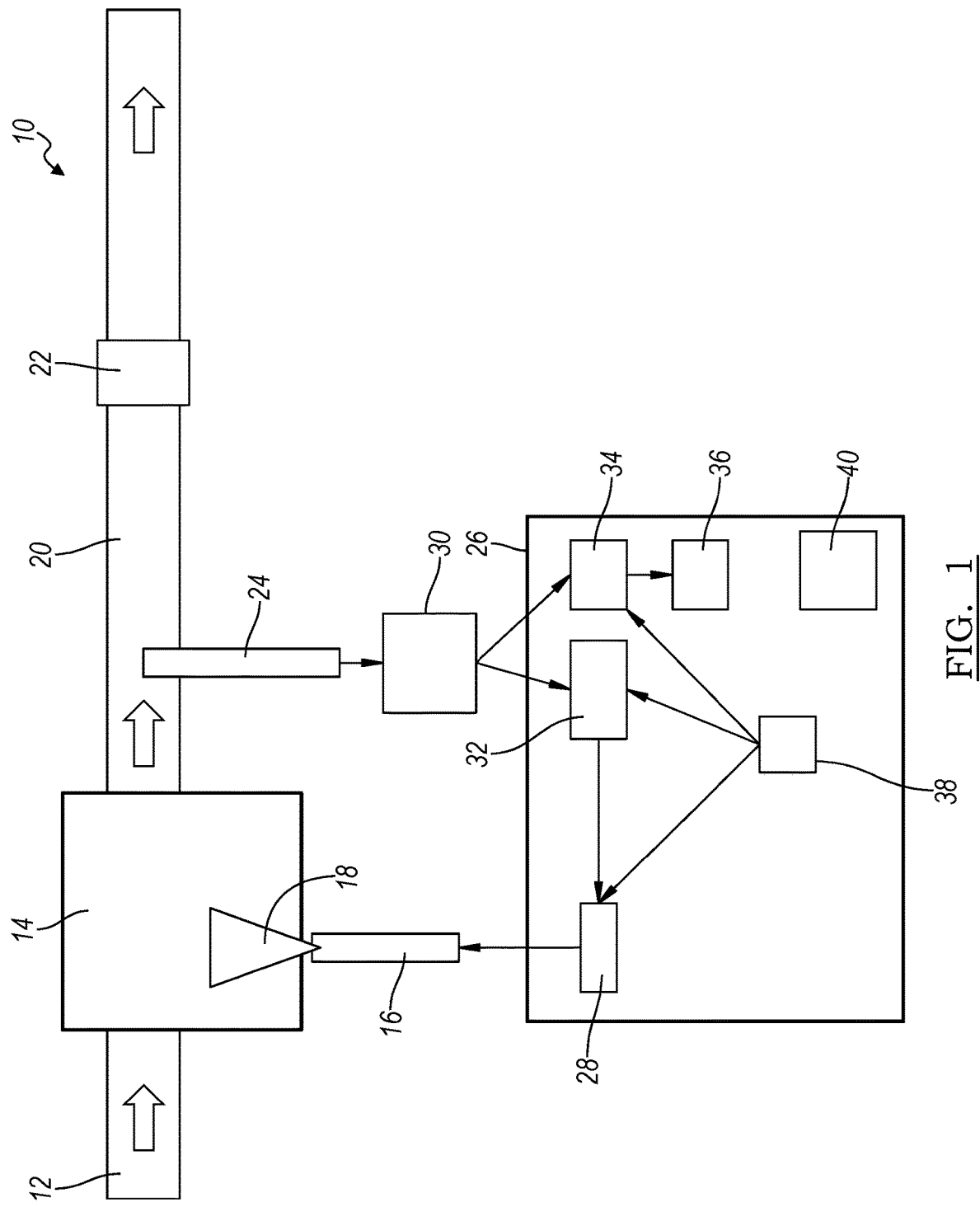
FIG. 1 is a flowchart of a system and method to detect and mitigate sensor degradation applied to an exhaust gas sensor according to an exemplary embodiment.

Referring to FIG. 1, a system and method to detect and mitigate sensor degradation 10 is depicted for use in developing a control system for an exemplary exhaust air fuel ratio (AFR) or vehicle sensor for an automobile. In one exemplary aspect of the he system and method to detect and mitigate sensor degradation 10 applied to a sensor an ambient air intake 12 feeds ambient air into a mixing and combustion chamber 14. A fuel injector 16 injects fuel as a spray pattern 18 into the mixing and combustion chamber 14 where a fuel and air mixture is ignited. Burned exhaust gas 20 is exhausted from the mixing and combustion chamber 14 typically through a catalytic converter 22 as is known.

An exhaust AFR sensor 24 is positioned in the flow stream of the burned exhaust gas 20. It is important that the engine out emissions as the burned exhaust gas 20 have average emissions constituents that are at stoichiometry. The exhaust AFR sensor 24 is used to determine whether the exhaust emissions are lean or rich of stoichiometry. For example if the output from the exhaust AFR sensor 24 indicates the system is lean, an engine control unit (ECU) 26 adjusts the system by changing fuel flow via the fuel injector 16 to be rich. The engine control unit (ECU) 26 applies a closed loop fuel control system to change the fuel control to drive the system the opposite way indicated by the exhaust AFR sensor 24 output.

The engine control unit (ECU) 26 includes a fuel control module 28 in communication with the fuel injector 16 which directs fuel flow through the fuel injector 16. The exhaust AFR sensor 24 is in communication with a sensor fault box 30 which is initially used to train the system by purposely corrupting the output signals from the AFR sensor 24. The corrupted signals are then compared to sensor operation at nominal operating parameters using an artificial intelligence program saved in a random access memory (RAM) device. The sensor fault box 30 communicates with each of an artificial intelligence compensation module 32 and an artificial intelligence fault predictor 34.

The artificial intelligence compensation module 32 generates changes to the control signals directed to the fuel control module 28 that maintain signal control of the AFR sensor 24 even as the corrupted signal changes are made by the sensor fault box 30. Signals generated by the artificial intelligence compensation module 32 therefore permit continued operation of the AFR sensor 24 in what would presently be considered to be a faulted state or condition, which therefore expands the operable range of operation and life of the AFR sensor 24. When testing oxygen or other sensors for diagnostic development and to control system robustness to them, the sensor fault box 30 can also be changed or tuned to simulate degrading sensors. Actuators are similarly evaluated.

The artificial intelligence fault predictor 34 collects operational data and corrupted data output from the exhaust AFR sensor 24. This data is compared to optimum sensor output data to identify a range of deviation of the exhaust AFR sensor 24 from the optimum output data.

An output from the artificial intelligence fault predictor 34 is communicated to a fault box settings module 36. The fault box settings module 36 provides predefined and saved conditional data for each sensor and actuator that is used as a threshold or trigger to generate either a "sensor faulted" or an "actuator failed" signal. For example, a level above which data from the exhaust AFR sensor 24 is considered faulted or failed is saved in a memory or lookup table and compared to the signal output from the artificial intelligence fault predictor 34, and when the sensor output is above the faulted or failed level, the sensor faulted or failed signal is generated. The sensor faulted or failed signal can be communicated to a control module which illuminates for example a check engine light.

The ECU 26 also includes an input module 38 which collects sensor and actuator output data from the other sensors and actuators of the vehicle, and coordinates using predefined criteria saved in a memory, in a lookup table or in a RAM which of this data is relevant in conjunction with the target sensor or actuator output data such as from the exhaust AFR sensor 24. Such data for the example of the exhaust AFR sensor 24 may include air temperature, air pressure, humidity, and the like. The ECU 26 coordinates the relevant data from the input module 38 for input to a unit which can alter an operating parameter of the system such as for example the fuel control module 28. The ECU 26 also coordinates the relevant data from the input module 38 for input to the artificial intelligence compensation module 32, allowing all relevant data to be used in conjunction with the artificial intelligence program to calculate changes to the control signals directed to the unit which can alter an operating parameter of the system such as the fuel control module 28 that maintain signal control of the AFR sensor 24 and the fuel injector 16.

For the example of the exhaust AFR sensor 24, an artificial intelligence pattern recognition program 40 is applied to the sensor output from the exhaust AFR sensor 24 to classify the patterns that are seen as the sensor control system ECU 26 creates fuel control changes in response to levels of oxygen sensor performance. The artificial intelligence compensation module 32 is embedded within an electronic control module (ECM). The artificial intelligence compensation module 32 is a non-generalized, electronic control device having a preprogrammed digital computer or processor having the artificial intelligence pattern recognition program 40 saved in random access memory (RAM) memory or non-transitory computer readable medium used to store data, instructions, lookup tables, etc., and a plurality of input/output peripherals or ports. The artificial intelligence compensation module 32 may have additional processors or additional integrated circuits in communication with the processor, such as logic circuits for analyzing data, or dedicated artificial intelligence circuits.

The artificial intelligence pattern recognition program 40 is a machine learning algorithm that can perform pattern recognition. Artificial intelligence programs can have a variety of different forms, including deep machine learning, hierarchical learning, supervised learning, semi-supervised learning, unsupervised learning, clustering, dimensionality reduction, structured prediction, anomaly detection, neural nets, reinforcement learning, and the like. In one aspect, in unsupervised learning, the artificial intelligence pattern recognition program 40 determines patterns from a stream of input or inputs.

The "patterns" that are evaluated by the artificial intelligence pattern recognition program 40 include but are not limited to output signal frequency, output signal amplitude, output signal geometry, and the like. For example if the output signal amplitude decreases or increases over time compared to the nominal sensor output signal amplitude saved in a memory or RAM, the artificial intelligence pattern recognition program 40 identifies first that a change has occurred which exceeds a predetermined threshold, indicating signal degradation, and then identifies how the change itself has altered over time, which provides an ongoing recognition of the degradation of the output signal amplitude up until a predetermined second threshold is reached indicating a sensor or actuator failure has occurred. The change that occurs which exceeds the predetermined threshold may for example be a change of up to +−10% of the signal amplitude, or a similar predetermined value, which indicates that sensor degradation has occurred.

The first and the second predetermined threshold data is applied which identifies when to classify the observed patterns as a sensor fault or as sensor degradation. In the above example for the oxygen or exhaust AFR sensor 24, changes in levels of sensor performance are compared to predicted or known sensor output patterns of a nominal or new exhaust AFR sensor to predict when the exhaust AFR sensor 24 is degrading or failed. The change that occurs which exceeds the predetermined threshold indicating a sensor fault has occurred may for example be a change exceeding +−10% of the signal amplitude or a similar predetermined value. The artificial intelligence pattern recognition program 40 can also be used to predict sensor performance based on emissions degradation over time and how the sensor fault box setting characterizes the performance. If the observed patterns from the sensor output indicating sensor or actuator degradation has occurred exceeding the predetermined threshold for a predetermined period of time less than the above example of +−10% of the signal amplitude but for a predetermined quantity of test loop cycles, the sensor may also be considered "faulted" and the system warning will be illuminated such as the check engine light.

The artificial intelligence pattern recognition program 40 functions as follows. A sensor or actuator output signal is received and a pattern of the signal is identified. The pattern of the signal is compared to a pattern of a signal from a nominal or new sensor or actuator of the same type which is saved in a memory, RAM or a lookup table. Differences between the patterns of the received output signal and the saved output signal which are within a predetermined statistical range which are further determined to be within a degraded but acceptable range are applied in a system controller to change system control parameters as necessary to allow the sensor or actuator, and the system to continue operation. Differences between the patterns of the received output signal and the saved output signal which fall outside of the predetermined statistical range defining the degraded range indicate a sensor or actuator failure, which trigger a sensor or actuator failure signal. As noted herein, signals from multiple other sensors and actuators can also be included in the analyses such that other sensor or actuator signals can be combined to enhance the sensor or actuator allowable operating range.

Referring to FIG. 2 and again to FIG. 1, a graph 42 presents multiple output signal data sets 44 from the exhaust AFR sensor 24 relating lean-to-rich times 46 versus different fault box settings 48. An un-modified output signal data set 50 from the exhaust AFR sensor 24 has a +−4 sigma (σ) range 52. When the output data is analyzed using the artificial intelligence pattern recognition program 40, a modified output signal data set 54 from the exhaust AFR sensor 24 has a +−4 sigma range 56 which is narrower than the unmodified output signal data set 50. When each of the modified output signal data sets applying multiple different fault box settings including 1.00, 1.20, 1.40, 1.60, 1.80, 2.00, 2.20, and 2.40 are analyzed, the exhaust AFR sensor 24 data indicates at a fault box setting of 2.00 the emissions reach a maximum allowable 1.3× emissions standard provided on an emissions standard vertical axis 58 to the right in FIG. 3, identified by a point 60 on the emissions standard vertical axis 58, and indicated by a point 62 on an emissions curve 64.

Figure 2:
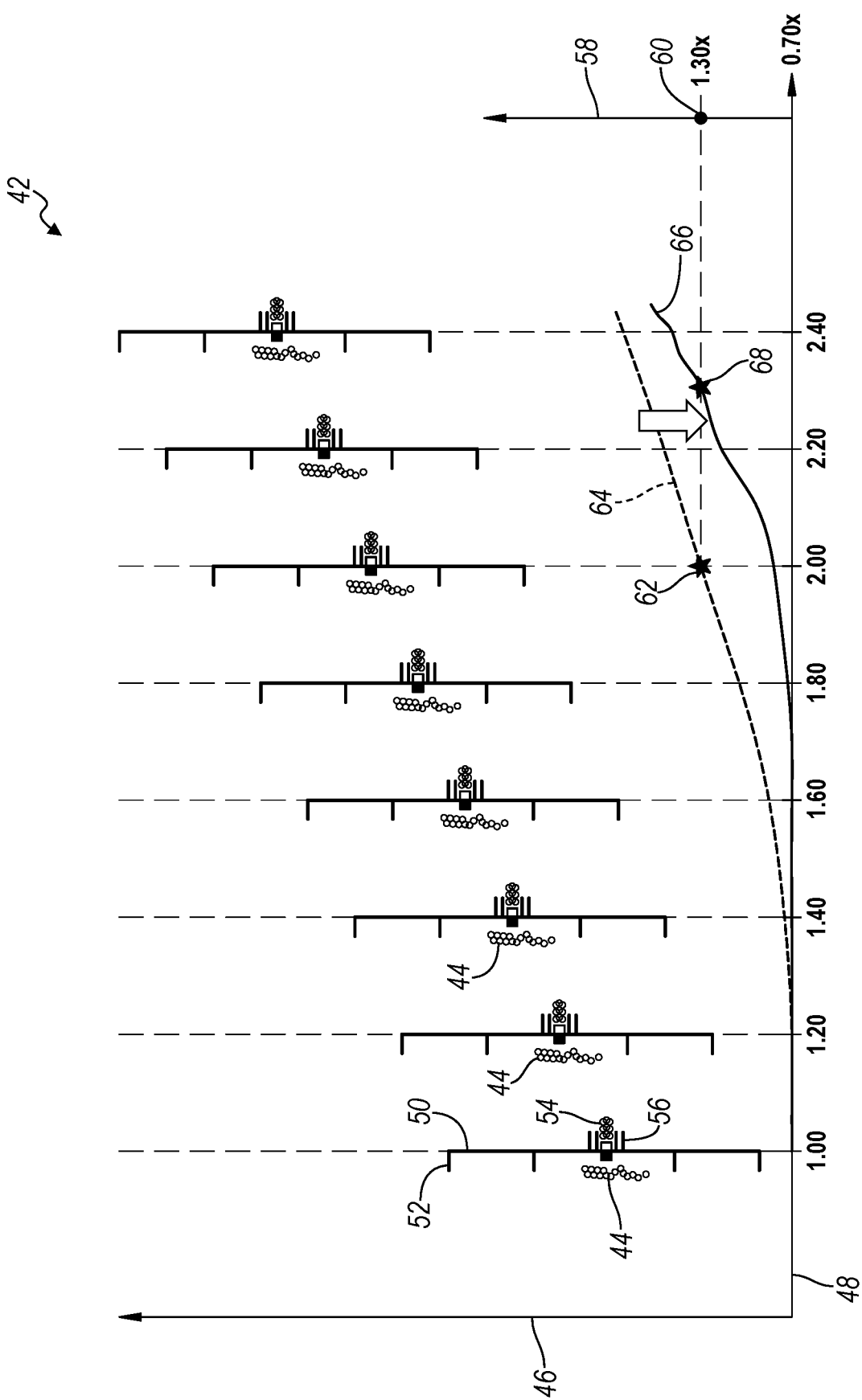
FIG. 2 is a graph depicting output signal data sets from an exhaust AFR sensor relating lean-to-rich times versus various fault box settings with and without the use of the artificial intelligence pattern recognition program of the present disclosure.

With continuing reference to FIGS. 1 and 2, by further application of the artificial intelligence pattern recognition program 40 to the control system via the engine control unit (ECU) 26, improved system control can be obtained. Using the present example of engine emissions, application of the artificial intelligence pattern recognition program 40 shifts the overall emissions curve downward as indicated by a modified emissions curve 66. At this emissions output, the 1.3× emissions standard at the point 60 on the emissions standard vertical axis 58 is met at a fault box setting of approximately 2.32 instead of 2.00 as indicated at a point 68 on the modified emissions curve 66.

Referring to FIG. 3 and again to FIG. 2, a graph 70 is modified from the graph 42 and further presents a probability of sensor diagnostic pass at each of the various fault box settings of FIG. 2. In order to be confident within the +−2 sigma range that a fault setting will set at the fault box setting of 2.00, a failure threshold is set at 160 ms indicated by a 160 ms time line 72 at the −2 σ threshold as indicated at a point 74. By further reprocessing the same data from the exhaust AFR sensor 24 using the artificial intelligence pattern recognition program 40 the variation +−4 σ range at each fault box setting is reduced. Each modified output signal data set 54 for the various fault box settings from the exhaust AFR sensor 24 is presented having the reduced variation +−4 σ range 56. Using the reduced variation +−4 σ range 56 for each sensor output fault box setting, the sensor fail threshold moves from 160 ms up to 210 ms at the same 1.3× emission standard and fault box setting of 2.00 at the −2 σ threshold as indicated at a point 76 on a 210 ms time line.

By further use of the modified emissions curve 66, as noted above the 1.3× emissions standard of 1.3× indicated by the point 60 on the emissions standard vertical axis 58 is met at a fault box setting of approximately 2.32. At the increased fault box setting of 2.32, while still within the +−2 sigma confidence range, a failure threshold can be further increased up to 270 ms as indicated at a point 78 on a 270 ms time line.

Figure 3:
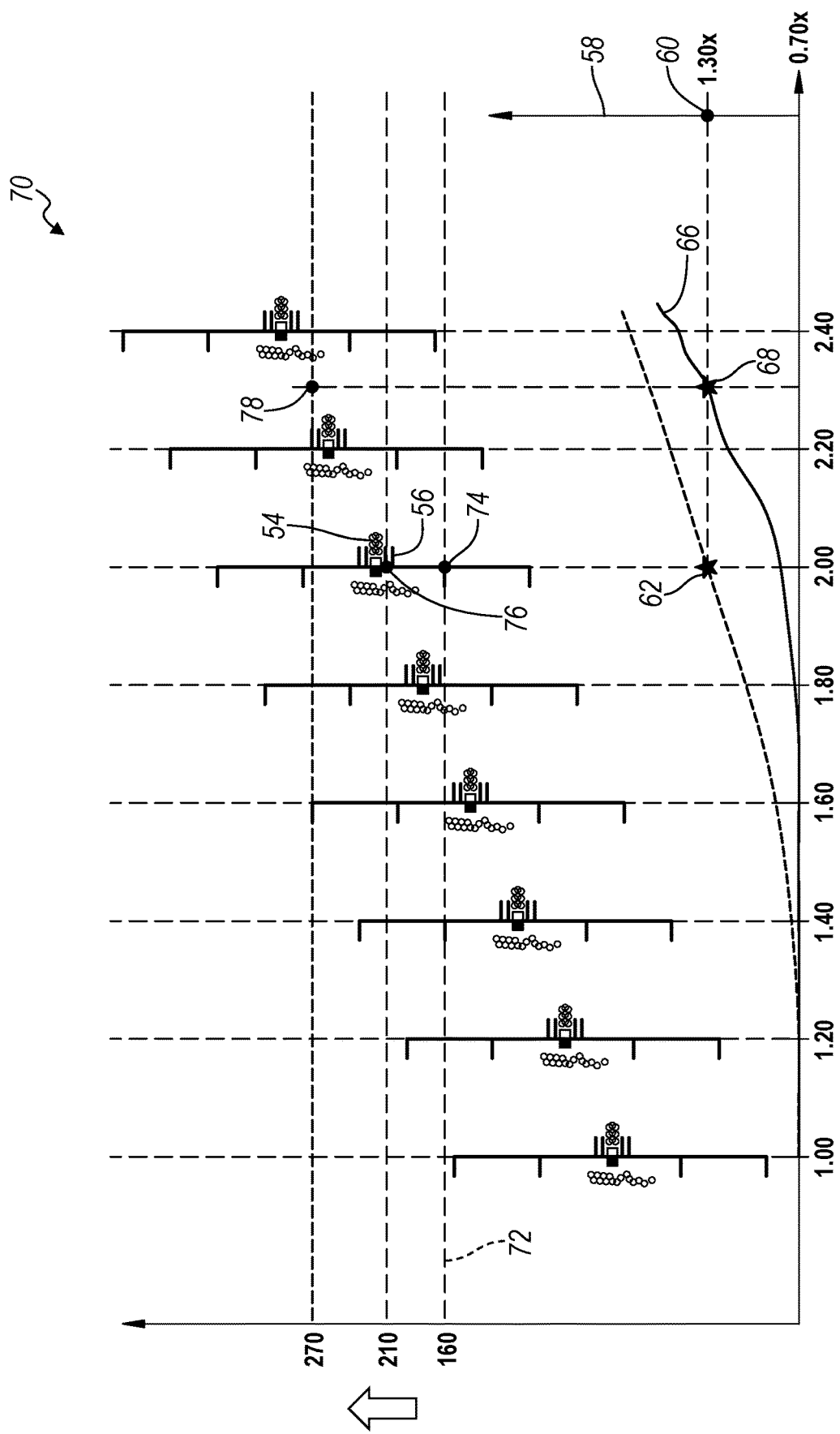
FIG. 3 is a graph modified from FIG. 2 to further include individual failure threshold timelines at various fault box settings.

Referring to FIG. 4 and again to FIGS. 2 through 3, a graph 80 presents a probability of sensor diagnostic pass 82 at each of the various fault box settings of FIG. 3. A probability of sensor diagnostic pass curve 84 indicates that without the use of the artificial intelligence pattern recognition program 40 at the fault box setting of 1.80, which is below the 1.3× emission standard reached at the fault box setting of 2.00, the probability of sensor diagnostic pass indicated at a point 86 is approximately 25%, therefore the probability of sensor diagnostic failure is approximately 75%.

Figure 4:
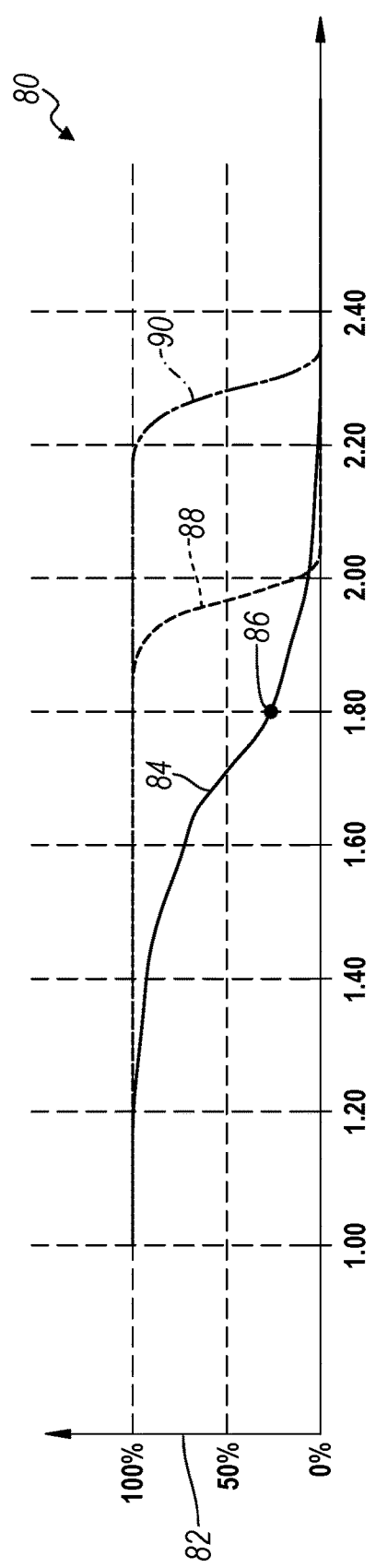
FIG. 4 is a graph depicting a probability of sensor diagnostic pass at each of the fault box settings of FIG. 3 with and without the use of the artificial intelligence pattern recognition program of the present disclosure.

With continuing reference to FIGS. 3 and 4, by reprocessing the same data from the exhaust AFR sensor 24 using the artificial intelligence pattern recognition program 40 the variation +−4 σ range at each fault box setting is reduced. Each modified output signal data set 54 for the various fault box settings from the exhaust AFR sensor 24 is presented having the reduced variation +−4 σ range 56. As previously noted herein, using the reduced variation +−4 σ range 56 for each sensor output fault box setting, the sensor fail threshold moved from 160 ms up to 210 ms at the same 1.3× emission standard and fault box setting of 2.00 at the −2 σ threshold.

A modified probability of sensor diagnostic pass curve 88 is shifted to the right of the probability of sensor diagnostic pass curve 84 and has a steeper transition slope compared to the probability of sensor diagnostic pass curve 84. By further use of the modified emissions curve 66, however, an enhanced probability of sensor diagnostic pass curve 90 is shifted still further to the right of the modified probability of sensor diagnostic pass curve 88 and provides increased operating range of the exhaust AFR sensor 24 before a sensor fail signal is generated. The enhanced probability of sensor diagnostic pass curve 90 has a similarly steep transition slope compared to the modified probability of sensor diagnostic pass curve 88.

Figure 5:
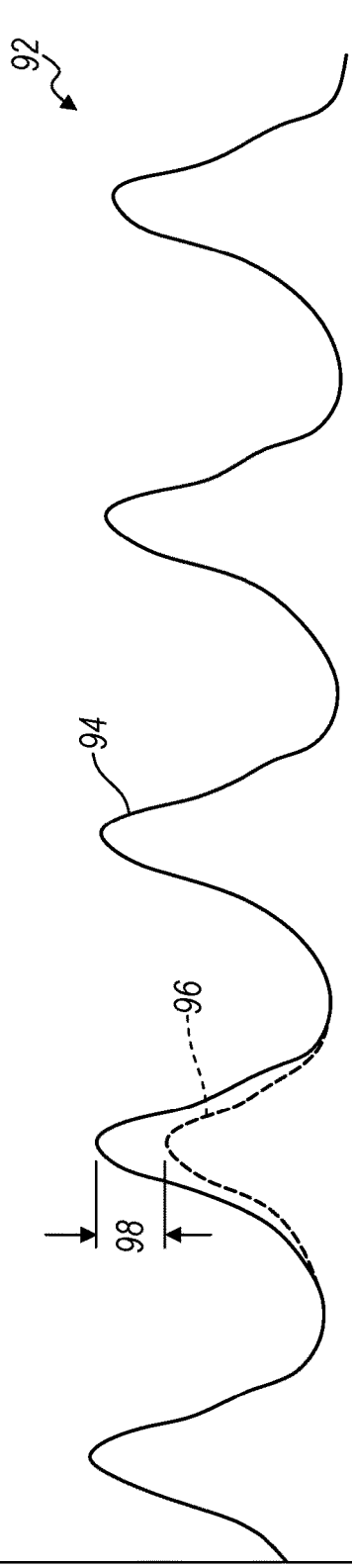
FIG. 5 is a graph of an engine speed pattern over time indicating a misfiring cylinder.

Referring to FIG. 5, an engine speed pattern 92 depicted over time provides a further example of an engine or control system sensor or actuator that is degrading that could benefit from applying the artificial intelligence pattern recognition program 40 to recognize the pattern of degrading output signal and change control performance to correct the system. In this example, a normal engine speed or firing pattern 94 is provided as a covariance of indicated mean effective pressure. This term is used to convey a quality of combustion, and the signal received from one or more sensors is compared to a pattern of engine misfire 96. A difference 98 between the pattern peaks identifies at least one misfiring piston and cylinder. The artificial intelligence pattern recognition program 40 analyzes the two patterns and identifies not only how the difference in patterns indicates a misfiring cylinder but how this condition can be corrected. The output from the artificial intelligence pattern recognition program 40 can then be applied to adjust fueling or spark until the pattern of engine misfire 96 is changed to more closely align to the normal engine speed or firing pattern 94.

The artificial intelligence pattern recognition program 40 applies pattern recognition to classify the sensor and actuator signal output and input patterns in reaction to engine control changes to identify the state of the sensors or the state of the engine. Sensor and actuator performance can also be predicted for example in the form of how much emissions degradation or sensor simulator setting would characterize it. If the classification that the sensor or actuator receives exceeds a threshold then the sensor or actuator will be considered "faulted" and a system warning will be illuminated. Secondly as sensor or actuator performance changes, the output from the artificial intelligence pattern recognition program 40 can be used to change the system control settings to minimize the degradation of the system performance, including but not limited to emissions, fuel economy or noise and vibration.

The method and system to control propulsion systems having sensor or actuator degradation of the present disclosure functions as follows. In a first step signal data is collected from at least one device which is outputting the signal data related to operational parameters of a vehicle system. In a second step patterns of the signal data are compared to patterns of signal data from a nominal operating device. In a third step identification is made when at least one of the patterns deviate from a level indicating the at least one device is operating in a degraded condition. In a fourth step corrective data is generated modifying a system control such that the at least one of the patterns is changed to correspond to the patterns of the signal data from the nominal operating device.

The method and system to control propulsion systems having sensor or actuator degradation of the present disclosure offers several advantages. The use of pattern recognition provided by the artificial intelligence pattern recognition program 40 can be applied to sensor and actuator output data patterns. By reviewing patterns of data output from various sensors and actuators, improvements and corrections can be made in system operating ranges and system control. These include application to sensors used to determine pressure, temperature, position, acceleration, chemical constituent, mass flow, voltage, and current and the like. The method and system to control propulsion systems having sensor or actuator degradation of the present disclosure can similarly be applied to actuators used in automobile vehicles, including actuators used for the fuel injector, throttle blade, turbo wastegate, CAM phasers, spark plug, fuel pump, exhaust gas recirculation, active fuel management, variable lift cam, alternator and electrical current, and variable geometry turbo and the like.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to detect and mitigate sensor or actuator degradation in an automobile system, comprising:
    collecting a signal data from at least one device which is outputting the signal data related to operational parameters of a vehicle system;
    analyzing patterns of the signal data compared to patterns of signal data from a nominal operating device;
    identifying when at least one of the patterns of the signal data from the at least one device deviate from a threshold, the deviation indicating the at least one device is operating in a degraded condition defining a degraded but acceptable range;
    continuing operation of the at least one device in the degraded condition until a predetermined second threshold is reached indicating a device failure has occurred; and
    selecting between the steps of:
        (a) generating corrective data to change the operational parameters of the vehicle system such that the at least one of the patterns is modified to correspond to the patterns of the signal data from the nominal operating device; or
        (b) if the corrective data cannot modify the patterns to correspond to the patterns of the signal data from the nominal operating device, identifying the at least one device as faulted.

2. The method to detect and mitigate sensor or actuator degradation in an automobile system of claim 1, further including analyzing the patterns using an artificial intelligence pattern recognition program.

3. The method to detect and mitigate sensor or actuator degradation in an automobile system of claim 2, further including identifying when differences between the patterns of the collected signal data and the patterns of signal data from the nominal operating device are within a predetermined statistical range.

4. The method to detect and mitigate sensor or actuator degradation in an automobile system of claim 3, further including identifying when the differences between the patterns of the collected signal data and the patterns of signal data from the nominal operating device are within the degraded but acceptable range.

5. The method to detect and mitigate sensor or actuator degradation in an automobile system of claim 3, further including generating a fail signal when the differences between the patterns of the collected signal data and the patterns of signal data from the nominal operating device exceed the degraded but acceptable range.

6. The method to detect and mitigate sensor or actuator degradation in an automobile system of claim 1, further including applying the corrective data using a system controller to change system control parameters to allow the at least one device and the system to continue operation.

7. The method to detect and mitigate sensor or actuator degradation in an automobile system of claim 1, further including prior to the analyzing step adding signals from at least one of multiple sensors and actuators together with the signal data from at least one device.

8. The method to detect and mitigate sensor or actuator degradation in an automobile system of claim 1, further including:
    generating a probability of device diagnostic pass for each of a plurality of device fault box settings; and
    reducing a variation +−4 σ range for each of the device fault box settings.

9. A method to detect and mitigate sensor or actuator degradation in an automobile system, comprising:
    collecting a signal data output from at least one device defining at least one sensor or actuator which is outputting the signal data in response to monitored operational parameters of a motor vehicle system;
    analyzing patterns of the signal data compared to a signal data output from a nominal operating one of the at least one device using an artificial intelligence program;
    identifying when the patterns of the signal data exceed a threshold level indicating the at least one sensor or actuator is operating in a degraded condition defining a degraded but acceptable range;
    continuing operation of the at least one device in the degraded condition until a predetermined second threshold is reached indicating a sensor or actuator failure has occurred;
    the at least one device including at least one of a sensor and an actuator, and further including modifying a control signal to change the operational parameters of the vehicle system until the signal data from the at least one device changes to substantially match the signal data from the nominal operating one of the at least one operating device.

10. The method to detect and mitigate sensor or actuator degradation in an automobile system of claim 9, further including identifying a state of the at least one sensor or actuator.

11. The method to detect and mitigate sensor or actuator degradation in an automobile system of claim 10, further including predicting a value of sensor or actuator degradation classifying the state of the at least one sensor or actuator.

12. The method to detect and mitigate sensor or actuator degradation in an automobile system of claim 10, further including illuminating a system warning if the classification exceeds a threshold defining the sensor or actuator is faulted.

13. The method to detect and mitigate sensor or actuator degradation in an automobile system of claim 9, further including:

generating an output from the artificial intelligence pattern recognition program when the patterns of the signal data exceed the threshold level; and applying the output from the artificial intelligence pattern recognition program to change at least one system control setting to minimize a degradation of the system performance, including emissions, fuel economy and noise and vibration.

\* \* \* \* \*